United States Patent
Bunzel et al.

(10) Patent No.: US 9,055,618 B2
(45) Date of Patent: Jun. 9, 2015

(54) OVEN AND METHOD FOR OPERATING AN OVEN

(75) Inventors: Volkmar Bunzel, Aalen (DE); Erhard Kaser, Colmberg (DE); Stefan Danzer, Wettringen (DE); Gülsüm Feuerlein, Neusitz (DE); Jessica Constanze Baschke, Rothenburg o.d. Tauber (DE); Friedrich Horn, Wornitz (DE)

(73) Assignee: ELECTROLUX HOME PRODUCTS CORPORATION N.V., Brussels (BE)

( * ) Notice: Subject to any disclaimer, the term of this patent is extended or adjusted under 35 U.S.C. 154(b) by 366 days.

(21) Appl. No.: 13/511,199

(22) PCT Filed: Dec. 3, 2010

(86) PCT No.: PCT/EP2010/007335
§ 371 (c)(1),
(2), (4) Date: Aug. 7, 2012

(87) PCT Pub. No.: WO2011/066976
PCT Pub. Date: Jun. 9, 2011

(65) Prior Publication Data
US 2012/0325801 A1    Dec. 27, 2012

(30) Foreign Application Priority Data
Dec. 3, 2009   (EP) .................................... 09014980

(51) Int. Cl.
*H05B 1/02*  (2006.01)
*H05B 6/64*  (2006.01)
*H05B 6/68*  (2006.01)

(52) U.S. Cl.
CPC .............. *H05B 6/6435* (2013.01); *H05B 6/687* (2013.01); *Y02B 40/143* (2013.01)

(58) Field of Classification Search
CPC ...... H05B 1/02; H05B 1/0261; H05B 1/0263; H05B 1/0266; H05B 3/0076; H05B 6/129; H05B 6/6435; H05B 6/687; H05B 6/6438
USPC ......... 219/482, 494, 412–414, 506, 702, 714, 219/720, 719
See application file for complete search history.

(56) References Cited

U.S. PATENT DOCUMENTS

| | | | | |
|---|---|---|---|---|
| 5,321,232 A * | 6/1994 | Ogle | ............................ | 219/506 |
| 6,759,637 B2 * | 7/2004 | Kim | ............................ | 219/702 |
| 6,809,301 B1 * | 10/2004 | McIntyre et al. | ............. | 219/506 |
| 6,949,729 B1 * | 9/2005 | Ishikawa et al. | .............. | 219/702 |

FOREIGN PATENT DOCUMENTS

| | | |
|---|---|---|
| EP | 0031589 | 7/1981 |
| EP | 0107736 | 5/1984 |
| EP | 1408721 | 4/2004 |

OTHER PUBLICATIONS

International Search Report for PCT/EP2010/007335, dated Mar. 17, 2011, 3 pages.

* cited by examiner

*Primary Examiner* — Mark Paschall
(74) *Attorney, Agent, or Firm* — Pearne & Gordon LLP

(57) ABSTRACT

Oven and method for operating an oven, comprising an On/Off-key (4), at least one key (3, 5) for choosing a predefined oven function or for choosing a predefined oven program and/or for programming a not predefined oven program, at least one specific key (6), which enables the user to start a preferred oven function or a preferred oven program from an Off-mode or a Standby-mode of the oven, wherein a running oven function or a running oven program can be saved by a memory unit as a preferred oven function or as a preferred oven program, when the specific key (6) is actuated at least for a predetermined period of time.

11 Claims, 1 Drawing Sheet

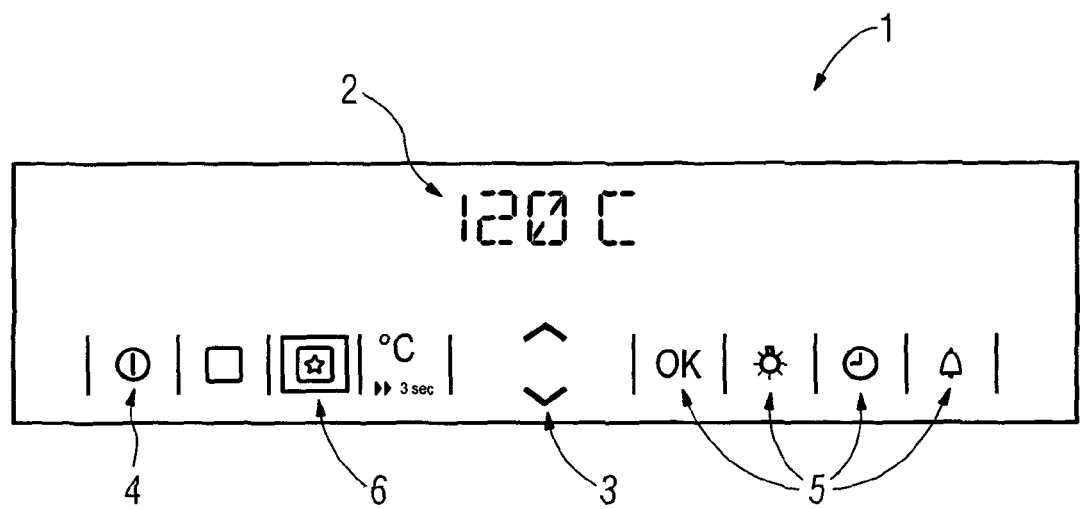

OVEN AND METHOD FOR OPERATING AN OVEN

BACKGROUND OF THE INVENTION

The present invention relates to an oven, comprising an On/Off-key, at least one key for choosing a predefined oven function or for choosing a predefined oven program and/or for programming a not predetermined oven program. Further the present invention relates to a method for operating such an oven.

DE 10 2006 032 087 A1 describes a program controlled household appliance having a simplified memory-function and a method for the program input. The household appliance has at least two manual switches, wherein the first switch enables to choose a free configurable operation program and the second switch enables to configure the settings of the free configurable operation program.

Such an appliance saves the user specified input directly to the free configurable operation program or to a currently running operation program.

EP 1 408 721 B1 describes a microwave oven, comprising a memory unit for storing a plurality of functions of the microwave oven, a plurality of buttons arranged to cause a specific function of the microwave oven to be executed when one of the plurality of buttons is pressed, a display unit having a screen and a control unit. The display unit and the screen are arranged to allow a user to select a selected function from the plurality of functions of the microwave oven such as a clock set, timer, sound on/off, reheat, defrost, which the user desires to set to a corresponding one of the plurality of buttons and the control unit is arranged to set the selected function of the microwave oven to the corresponding button, and to allow the selected function of the microwave oven to be executed when the corresponding button is pressed.

The microwave oven is provided with special function buttons allowing functions of the microwave oven to be set by a user arbitrarily, thereby allowing the user to set functions of the microwave oven to the special function buttons as desired.

EP 0 898 003 B1 describes a multi-function control device for washing machines with a display indication with selectable operating programs able to be illustrated in plain text, with a control knob for calling up the indication of an operating program in the display by rotating the control knob and with a button with an "enter" function for selection of a called-up operating program. The display indication has several lines and in which several operating programs can be indicated simultaneously, of which one can be called up by rotation of the control knob and selected by the button or placed in operation or combined with another program or program part. Supplementary special buttons are constructed for storage of defined operating program combinations.

By means of the control knob, all control programs can be illustrated on the display and can be chosen by actuating an "enter"-function.

In all known household appliances described in the aforementioned documents, the user has to carry out multiple operating steps to operate the household appliance in the preferred operation mode.

BRIEF SUMMARY OF THE INVENTION

An object of the present invention is to simplify the operation of an oven.

A solution of this object according to the invention is defined and characterized by the claims.

According to the present invention, a method for operating an oven comprises the following steps:
  Operating the oven with an oven function or an oven program chosen or programmed by the user
  Saving the oven function or the oven program by actuating a specific key for at least a predetermined period of time, while the oven function or the oven program to be saved is running
  Starting the saved oven function or the oven program by actuating the specific key, when the oven is in the Off-mode or in the Standby-mode.

Thus, the user is enabled to start the oven with a preferred predefined or self-configured oven function or oven program from the Off-mode or from the Standby-mode. An oven quick start is realised without the need for the user to carry out any operating steps before.

Also according to the present invention, an oven comprises an On/Off-key, at least one key for choosing a predefined oven function or for choosing a predefined oven program and/or for programming a not predefined oven program, at least one specific key, which enables the user to start a preferred oven function or a preferred oven program from an Off-mode or a Standby-mode of the oven, wherein a running oven function or a running oven program can be saved by a memory unit as a preferred oven function or as a preferred oven program, when the specific key is actuated at least for a predetermined period of time.

The user is enabled to chose comfortably a predefined oven function or for choosing a predefined oven program and/or for programming a not predefined oven program by himself, that shall be carried out, when the specific key is acuatated. E.g. a standard program for frozen food can be started by the specific key, when frozen food is often preferred by the user.

According to advantageous embodiment of the invention, a running oven function or a running oven program is saved, when the specific key is actuated for a predetermined period of time. Thus, a very intuitive operation is possible, because the same key for starting the favourite function or program is used for saving the favourite function or program. Saving of the running function or program can be achieved, when the specific key is actuated e.g. at least several seconds. Contrarily to that, starting the favourite function or program requires e.g. short actuation of the specific key, e.g. half a second.

According to a further advantageous embodiment of the invention, the specific key is pre-configured in the manufacturing process to start a certain standard oven function or a certain standard oven program and wherein the user is always enabled to change the pre-configuration for the specific key to start another standard oven function or another standard oven program or a self-defined oven function or a self-defined oven program. Hence, the user has the possibility to use the pre-configuration of the specific key or to use another preferred function or program.

According to another advantageous embodiment of the invention, the oven can be started automatically in a predefined operating mode by actuating the specific key. Thus, the oven is started without the need for the user to chose or to configure the operation mode of the oven, e.g. selecting the heat source, the temperature or the cooking time or the like. All parameters are made available to the oven by actuating the specific key.

According to a further advantageous embodiment of the invention an oven function comprises temperature values and/or temperature profiles and/or the use of certain heat sources independent from the food stuff to be cooked. An oven can be operated with several oven functions, wherein the oven e.g. tracks a certain temperature profile to a predefined end of the cooking time. Thus, an ideal cooking results can be achieved.

According to a further advantageous embodiment of the invention an oven program comprises temperature values and/or temperature profiles and/or the use of certain heat sources that are adapted to the food stuff to be cooked. An oven can be operated with several oven programs. The oven programs are adapted to the food stuff to be cooked with, such as cooking frozen Pizza or baking bread. Also in this operating mode ideal cooking results can be achieved.

According to another advantageous embodiment the favourite oven function or favourite oven program can be modified while running and is reset after the oven is switched to the Off-mode or switched to the Standby-mode. Thus, the favourite function or program can be adapted to the current cooking result, e.g. the temperature can be set lower, when necessary. Further, the original settings of the favourite program are restored, when the oven is switched off or switched to standby and the oven can be started again with the same favourite program.

BRIEF DESCRIPTION OF THE DRAWING

FIG. 1 is a front view of an operation panel for a household appliance embodying the invention;

DETAILED DESCRIPTION OF THE INVENTION

In FIG. 1 an operation panel 1 for a household appliance is shown, having a display 2, adjusting keys 3 for adjusting an operation value to a value desired by the user, an On/Off-key 4, various keys 5 for choosing a predetermined oven function or for choosing a predetermined oven program or for programming a not predetermined oven program. Further the operation panel 1 is provided with a specific key 6. When the specific key 6 is actuated, the oven starts automatically the oven function or the oven program preferred by the user. By actuating the specific key 6 the oven function or oven program can be started by the oven, when the oven itself is in the Off-mode or in the Standby-mode.

Originally the oven comprises settings of the oven function with certain values, which are predefined in the manufacturing process. These settings of the oven function disclose e.g. a temperature value or a temperature profile, a predefined cooking or heating period, but also other features as charging of steam to the oven or rotational speed of a turn-spit. Thus, the user is enabled to define an own favourite program for starting the oven with, wherein the user configures such parameters by himself. Or alternatively he defines an existing oven function or oven program as the favourite program.

After having actuated the specific key and thus having started the oven with the favourite oven function or favourite oven program, the oven can be switched off by actuating the On/Off-key 4.

The favourite function or the favourite program can be saved in a memory unit by actuating the specific key 6 while the specific key 6 is actuated longer than e.g. 3 seconds, while an oven function or an oven program is running. The saved oven program or oven function is now the favourite program or favourite function and can be started from the Off-mode or the Standby-mode. The oven can be switched-off by a user to be in the Off-mode or the oven can be switched-off automatically, e.g. by a control unit, after a predetermined period of time in the Standby-mode. Usually, the oven is in the Standby-mode, when it is on, but no oven function or oven program is running. However, it is also possible, that starting the favourite function or the favourite program is allowed, although an oven function is running. Such functions might be the illumination of the oven etc. Thus, the Standby-mode is defined by the non-running of a function or a program heating up the oven.

REFERENCE NUMBERS 1 operation panel
2 display
3 adjusting keys
4 On/Off key
5 various keys
6 specific key

What is claimed is:

1. Method for operating an oven comprising the following steps:
Operating the oven with at least one of an oven function and an oven program chosen or programmed by the user;
Saving the at least one of an oven function and an oven program by actuating a specific key for at least a predetermined period of time, while the at least one of an oven function and an oven program to be saved is running;
Starting the saved at least one of an oven function and an oven program by actuating the specific key, when the oven is in an Off-mode or in an Standby-mode.

2. The method according to claim 1, wherein the step of saving the at least one of an oven function and an oven program comprises of actuating only the specific key.

3. The method according to claim 1, wherein the step of starting the saved at least one of an oven function and an oven program comprises of actuating only the specific key.

4. The method according to claim 1, wherein when carried out for a first time, the step of saving the at least one of an oven function and an oven program also deletes at the same time a standard oven function or a standard oven program pre-configured in a manufacturing process of the oven.

5. An oven, comprising;
an On/Off-key;
at least one key configured to perform at least one of the following functions: choosing a predefined oven function, choosing a predefined oven program, and programming a not predefined oven program;
a specific key configured to be actuated by a user for a predetermined period of time to save at least one of an oven function and an oven program that is running.

6. Oven according to claim 5, wherein the specific key is pre-configured in a manufacturing process to start at least one of a certain standard oven function and a certain standard oven program and wherein the user is always enabled to change the pre-configuration for the specific key to start another standard oven function or another standard oven program or self-defined oven function or a self-defined oven program.

7. Oven according to claim 5, wherein the oven can be started automatically in a predefined operating mode by actuating the specific key.

8. Oven according to claim 5, wherein an oven function comprises temperature values and/or temperature profiles and/or the use of certain heat sources independent from the food stuff to be cooked.

9. Oven according to claim 5, wherein an oven program comprises temperature values and/or temperature profiles and/or the use of certain heat sources that are adapted to the food stuff to be cooked.

10. Oven according to claim 5, wherein the favourite oven function or favourite oven program can be modified while running and is reset after the oven is switched to the Off-mode or switched to the Standby-mode.

11. Oven according to claim 5, wherein the oven is configured to start the at least one of a running oven function and a running oven program while the oven is at an Off-mode or a Standby-mode by the user only actuating the at least one specific key for a period of time shorter than the predetermined period of time.

* * * * *